United States Patent [19]

Lehnert et al.

[11] 4,046,710

[45] Sept. 6, 1977

[54] POLYMERIZATION OF CYCLIC OLEFINS

[75] Inventors: Günther Lehnert; Dieter Maartens; Gottfried Pampus, all of Leverkusen, Germany; Josef Witte, Cologne, Germany

[73] Assignee: Bayer Aktiengesellschaft, Germany

[21] Appl. No.: 652,884

[22] Filed: Jan. 27, 1976

Related U.S. Application Data

[63] Continuation of Ser. No. 481,188, June 20, 1974, abandoned.

[30] Foreign Application Priority Data

June 27, 1973 Germany .............................. 2332563

[51] Int. Cl.² .............................................. C08F 4/78
[52] U.S. Cl. ................................ 252/429 B; 526/169; 252/431 R
[58] Field of Search ......................... 252/429 B, 431 R

[56] References Cited

U.S. PATENT DOCUMENTS 3,492,245  1/1970  Calderon et al. ................. 252/429 B
3,781,257  12/1973  Pampus et al. ............... 252/429 B X

*Primary Examiner*—Patrick P. Garvin
*Attorney, Agent, or Firm*—Connolly and Hutz

[57] ABSTRACT

A process for the preparation of a catalyst for the polymerization and copolymerization of cyclic olefins which have 4, 5, 7 or more ring carbon atoms and at least one olefinic double bond in the ring, from
  a. at least one halide or oxyhalide of molybdenum, preferably with molybdenum in the oxidation state +5,
  b. at least one 2-halo alcohol and
  c. at least one aluminium compound in the molar ratio of $a:b = 1:1$ to $1:10$ and $a:c = 1:0.5$ to $1:30$, characterized in that the molybdenum halide or oxyhalide and the 2-halo alcohol are reacted with the exclusion of solvents or in the presence of chlorinated solvents which are inert towards the molybdenum salt and in which the molybdenum salt is soluble to an extent of at least 0.01 molar, and the aluminium alkyl compound is added, optionally in the presence of the monomers.

5 Claims, No Drawings

POLYMERIZATION OF CYCLIC OLEFINS

CROSS-REFERENCE TO RELATED APPLICATION

This application is a continuation of application Ser. No. 481,188 filed June 20, 1974 and now abandoned.

The ring opening polymerisation of cycloolefins using catalysts which contain tungsten compounds or molybdenum compounds to produce open chain unsaturated polymers is already known. Thus the catalysts proposed for this purpose in U.S. Pat. No. 3,492,245 are composed inter alia of a. molybdenum or tungsten salts,
b. alcohols and
c. organo aluminium compounds.

According to German Offenlegungsschrift No. 1,770,491, 2-haloalcohols are used in combination with tungsten salts and organo aluminium compounds to obtain an unexpected increase in the catalyst activity and decisive improvements for carrying out the process technically. For example when $WCl_6$ is reacted with 2-chloroethanol in toluene, readily soluble tungsten compounds are obtained which are indefinitely stable in this solution although $WCl_6$ itself is only sparingly soluble in toluene while reaction products of $WCl_6$ with unsubstituted alcohols, e.g. ethanol, decompose within a few hours in toluene solution with deposition of tungsten oxychlorides.

Molybdenum salts, e.g. $MoCl_5$, cannot be reacted with 2-chloroalcohols, e.g. 2-chloroethanol, in toluene. No homogeneous and stable solutions are obtained. In combination with aluminium alkyl compounds, these solutions form catalysts which are only moderately active for the ring opening polymerisation of cycloolefines. Using molybdenum compounds instead of tungsten compounds does, however, assuming they have the same catalytic activity, provide considerable technical advantages.

It is an object of this invention to find molybdenum compounds which are completely soluble in organic, inert solvents and indefinitely stable at room temperature and which after activation with organo aluminium compounds give rise to highly active catalysts for the ring opening polymerisation of cyclic olefines. This problem has now been solved by reacting molybdenum halide or oxyhalide with 2-halo alcohols with the exclusion of solvents or in chlorinated solvents which are inert towards molybdenum compounds and in which the molybdenum compounds are soluble to an extent of at least 0.01 and preferably 0.02 m.

This invention therefore relates to a process for the preparation of a catalyst for the polymerisation and copolymerisation of cyclic olefines which contain 4,5,7 or more ring carbon atoms and have at least one olefinic double bond in the ring from a. at least one halide or oxyhalide of molybdenum, preferably molybdenum in the oxidation state + 5,
b. at least one 2-haloalcohol and
c. at least one aluminium alkyl compound in a molar ratio of $a : b = 1 : 1$ to $1 : 10$ and $a : c = 1 : 0.5$ to $1 : 30$ wherein the molybdenum halide or oxyhalide and the 2-haloalcohol are reacted with the exclusion of solvent or in the presence of chlorinated solvents which are inert towards the molybdenum salt and in which the molybdenum salt is soluble to form an at least 0.01 molar solution, and the aluminium alkyl compound is added, optionally in the presence of the monomers.

The invention also relates to a process for polymerising cyclic olefins having 4, 5, 7 or more ring members on catalysts of (a), (b) and (c) which have been prepared by reacting molybdenum halide or oxyhalide and 2-haloalcohol with the exclusion of solvents or in the presence of chlorinated solvents which are inert towards the molybdenum salt and in which the molybdenum salt is soluble to form an at least 0.01 molar solution followed by the addition of aluminium alkyl.

The following are examples of catalyst components which may be used:

a. Molybdenum halides or oxyhalides such as $MoCl_5$, $MoOCl_3$
b. 2-Haloalcohols of the general formula

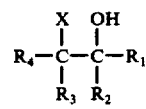

wherein X denotes chlorine, bromine or iodine; $R_1$ and $R_2$ are the same or different and denote hydrogen, alkyl, aryl or alkylaryl groups; $R_3$ and $R_4$ are the same or different and denote chlorine, bromine, iodine, hydrogen or alkyl, aryl or alkylaryl groups; and $R_1$ and $R_3$ or $R_2$ and $R_4$ may be linked together to form a 5-membered or larger hydrocarbon ring. Alkyl groups are in particular those with 1 to 6 carbon atoms, aryl groups those with 6 – 10 carbon atoms, and alkylaryl groups a combination of the two. When $R_1$, $R_2$, $R_3$ and $R_4$ represent hydrocarbon groups, they may be partly or completely halogenated. The following are examples: 2-chloroethanol; 2-bromoethanol; 2-iodoethanol; 1,3-dichloropropanol-2; 2,3-dibromopropanol-1; 2,2,2-trichloroethanol; 2-chlorocyclohexanol and 2-chlorocyclopentanol.

2-Chloroethanol is preferred for reasons of economy.

c. Aluminium alkyl compounds such as
1. Aluminium trialkyls (preferably with 1–6 carbon atoms per alkyl group), e.g. $Al(CH_3)_3$, $Al(C_2H_5)_3$ or $Al(i-C_4H_9)_3$,
2. Aluminium dialkylhalides (preferably chlorides and bromides; preferably with $C_1 - C_6$ alkyl groups), e.g. $Al(C_2H_5)_2Cl$ or $Al(C_2H_5)_2Br$,
3. Aluminium alkyl dihalides (preferably chlorides and bromides, preferably with $C_1 - C_6$ alkyl groups), e.g. $Al(C_2H_5)Cl_2$,
4. so-called aluminium sesquihalides, i.e. equimolar mixtures of products of (2) and (3), e.g. $(CH_3)_3Al_2Cl_3$ or $(C_2H_5)_3Al_2Cl_3$, or etherates of the above mentioned aluminium alkyl compounds.

According to the invention, components (a) and (b) of the polymerisation catalysts are reacted together, preferably at $-30°$ to $20°$ C, until evolution of hydrogen halide ceases. This reaction is preferably carried out with the exclusion of solvents although solvents which are inert towards the molybdenum salts and in which the salts are sufficiently soluble may be used. Suitable solvents for this purpose are, for example, chlorobenzene, 1,2-dichlorobenzene, methylene chloride and chloroform. Non-halogenated and non-polar solvents such as benzene, toluene or carbon tetrachloride are unsuitable for the reaction, either because the molybdenum compounds are insufficiently soluble in these solvents or because the reaction does not take the desired course.

After termination of the reaction between components (a) and (b), the usual solvents used for ring opening polymerisation may be used, for example also toluene or benzene, either for diluting the solutions or for polymerisation.

Ring opening polyermisation is generally carried out in solution although it may be carried out without solvents so that only small quantities of solvent are introduced into the system with components (a) and (b). The solvents used for the polymerisation process may be aliphatic solvents such as pentane, hexane, heptane or isooctane, cycloaliphatic solvents such as cyclopentane or cyclohexane, aromatic solvents such as benzene, toluene, or xylene or chlorinated solvents such as methylene chloride, chloroform or chlorobenzene. The monomers may be used as 5–50% solutions in the said solvents. It is preferred to employ a monomer concentration of 15 to 30%.

The process is generally carried out by adding the aluminium alkyl compound (c) and molybdenum compound of (a) and (b) to a solution of the monomer or monomers in a suitable solvent and letting polymerisation proceed. It is not necessary to prepare the catalyst separately. Polymerisation is carried out under an inert gas atmosphere, for example nitrogen, as is customary when organometallic mixed catalysts are used. The sequence in which the catalyst components are added is not critical although the aluminium compound is preferably added before the molybdenum compound.

The temperature at which the catalyst is prepared may be −80° to 50° C and is preferably −20° to 30° C. The polymerisation temperature may be −40° to 40° C and is preferably ±0° to 20° C. The polymerisation time depends on the chosen conditions and is generally 1 to 5 hours. Conversions of 70% or more are obtained in this way. No gel formation occurs even at higher conversions.

The molecular weights can be varied by suitable choice of the catalyst components or composition. It is preferred, however, to regulate the molecular weights in known manner by adding copolymerisable olefines. Thus, the molecular weights of polymers are lowered by the addition of small quantities of open chain olefines, for examle butene-(1), while the addition of bicyclic diolefines, for example norbornadiene, causes an increase in molecular weight accompanied by chain branching.

When the required degree of conversion has been reached, polymerisation may be stopped, e.g. by the addition of alcohols, carboxylic acids and/or amines. The polymers can be stabilized against oxygen by the addition of known antioxidants, for example phenyl-β-naphthylamine, 2,6-ditert.-butyl-4-methylphenol or 2,2′-dihydroxy-3,3′-di-tert.-butyl-5,5′-diphenyl-dimethylmethane in quantities of 0.1 to 3%.

The polymers can be isolated in known manner, e.g. by precipitation with an alcohol or steam distillation.

The polymerisation process described here has considerable advantages over the known art.

Since molybdenum has only about half the atomic weight of tungsten, the polymers produced according to the invention are distinguished by their very low ash contents. In addition, due to the smaller quantities of transition metal used, the contamination of effluent water is considerably reduced and its purification facilitated.

The polymers obtained according to the invention are predominantly rubber-like polymers which can be processed in known manner, for example vulcanizates which have excellent properties can be produced with the aid of known sulphur-containing vulcanization systems. The high elasticity and high abrasion resistance should be particularly mentioned.

EXAMPLE 1 a. Reaction of $MoCl_5$ with 2-chloroethanol

Molar ratio 1 : 5

5.47 g (20 mmol) of $MoCl_5$ are reacted with 8.05 g (100 mmol) of 2chloroethanol at 0° C in a stirrer vessel with the exclusion of oxygen and moisture and the temperature is raised to 20° C in the course of one hour. The hydrogen chloride formed in the reaction is removed by a stream of nitrogen. The $MoCl_5$ dissolves completely to form an intensely coloured green solution. After 6 hours at 20° C, the solution is diluted to 0.1 molar with toluene.

b. Polymerisation 600 g of toluene and 200 g of cyclopentene are introduced into a stirred glass vessel with exclusion of oxygen and moisture, and a mixture of 1.2 mmol of diethylaluminium chloride and 1.8 mmol of δ, δ′-dichlorodibutylether is added at 25° C under nitrogen. When 6 ml of the solution prepared under (a) (0.6 mmol Mo) are added, polymerisation sets in at once, as can be recognised by the increase in the viscosity of the solution. The polymerisation temperature is kept at 25° C by cooling. Polymerisation is stopped after 3 hours by the addition of a mixture of 1.5 g of tri-n-butylamine, 0.5 g of 2,2′-dihydroxy-3,3′-di-tert.-butyl-5,5′-dimethyldiphenylmethane, 3 g of ethanol and 50 ml of toluene. The polymer is isolated by precipitation with ethanol and dried in a vacuum at 50° C. The conversion after 3 hours is 131 g, i.e. 65.5% of the theory. [η] in toluene at 25° C: 2.6. % trans-double bonds (IR spectroscopy): 79.3%.

EXAMPLE 2

6000 g of toluene and 2000 g of cyclopentene are introduced into a stainless steel autoclave at 25° C in a manner analogous to Example 1(b). To this mixture are added first 18 mmol of diethylaluminium monochloride and then 60 ml of the solution prepared according to 1(a). The conversion after 3 hours is 1340 g, i.e. 67% of the theory. [η] in toluene at 25° C: 2.8.

% trans-double bonds (IR spectroscopy): 77.2%.

EXAMPLE 3 (COMPARISON EXAMPLE)

a. Reaction of $MoCl_5$ with ethanol

Molar ratio: 1 : 5

20 mmol of $MoCl_5$ and 100 mmol of ethanol are reacted as described under 1(a). The molybdenum compound dissolves to form a deep green solution but in contrast to 1(a) progressive deposition of crystals sets in after only 24 hours at 20° C so that the solution cannot be used for more than 12 hours.

b. Polymerisation 1.5 mmol of diethylaluminium chloride and 6 ml of the solution preprared according to 3(a) (0.6 mmol of Mo) are added at 25° C to 800 g of toluene and 200 g of cyclopentene in a manner analogous to Example 1(b).

The conversion after 3 hours is only 80 g, i.e. 40% of the theory. [η] in toluene at 25° C: 2.6.

% trans-double bonds (IR spectroscopy): 79.5%.

EXAMPLE 4 a. Reaction of MoCl₅ with 2-chloroethanol

Molar ratio: 1 : 3

20 mmol of MoCl₅ and 60 mmol of 2-chloroethanol are reacted as described in Example 1(a). After 24 hours at 20° C, the solution is diluted to a 0.5 molar concentration with toluene.

b. Polymerisation

A mixture of 260 ml of toluene, 100 ml of cyclopentene and 7.5 mg of butene-(1) is introduced into a stirred vessel made of glass. 0.46 mmol of diethylaluminium chloridedibutyletherate are added, followed by 0.46 ml of the solution prepared under 4(a) (0.23 mmol of Mo). Polymerisation is terminated after 3 hours at 20° C as described in Example 1(b). The conversion after 3 hours is 50.7 g, i.e. 66.4% of the theory. [η] in toluene at 25° C: 2.8.

% trans-Double bonds (IR spectroscopy): 80.1.

c. Polymerisation

The catalyst solution obtained according to 4(a) can be used for polymerisation for over 4 weeks. The results obtained from polymerisation after 4 weeks were identical to those obtained under 4(b).

EXAMPLE 5 a. Reaction of MoCl₅ with 2-chloroethanol in CH₂Cl₂

Molar ratio: 1 : 3

20 ml of MoCl₅ are suspended in 10 ml of methylene chloride in a stirrer vessel as in Example 1(a), and 60 mmol of 2-chloroethanol in 5 ml of methylene chloride are added dropwise at 20° C. After 6 hours at 20° C, the solution is diluted to 1 molar.

b. Polymerisation

Polymerisation is carried out as described in Example 4(b) but the molybdenum component used is 0.23 ml of the solution prepared under 5(a). The conversion after 3 hours is 50.2 g, i.e. 65.9% of the theory. [η] in toluene at 25° C: 2.5

% trans-Double bonds (IR spectroscopy): 79.3.

c. Polymerisation

Example 5(b) is repeated but using diethylaluminium chloride-δ,δ-dichlorodibutyletherate. The conversion after 3 hours is 53.3 g, i.e. 69.8% of the theory.

d. Polymerisation

Example 5(b) is repeated but without butene-(1) and using the dibutyletherate of triethyldialuminium trichloride. The conversion after 3 hours is 50.8 g, i.e. 66.8% of the theory. [η] in toluene at 25° C: 3.6.

% trans-Double bonds (IR spectroscopy): 80.3.

EXAMPLE 6 (COMPARISON EXAMPLE)

Reaction of MoCl₅ with tert.-butanol 20 mmol of MoCl₅ are reacted with 60 mmol of tert.-butanol as described under 5(a). No homogeneous solution is obtained.

We claim:

1. A process for the preparation of a catalyst composition which consists essentially of reacting at least one halide or oxyhalide of molybdenum with at least one 2-haloalcohol at −30° to 20° C. until evolution of hydrogen halide ceases either in the absence of solvent or in the presence of at least one chlorinated polar solvent which is inert towards the molybdenum compound and in which the molybdenum compound is soluble at least to the extent of being able to obtain a 0.01 molar solution, and then adding at least one organoaluminum compound selected from the group consisting of aluminum alkyl and aluminum haloalkyl, the mole ratio of molybdenum compound to the haloalcohol being 1:1 to 1:10 and the mole ratio of the molybdenum compound to the organoaluminum compound being 1:0.5 to 1:30.

2. A process as claimed in claim 1, in which the molybdenum compound is in the +5 oxidation state.

3. A process as claimed in claim 1, in which the molybdenum compound is MoCl₅ or MoOCl₃.

4. A process as claimed in claim 1, in which the 2-haloalcohol is 2-chloroethanol.

5. Catalyst compositions when produced by a process as claimed in claim 1.

* * * * *